(12) United States Patent
Chen et al.

(10) Patent No.: US 9,853,832 B2
(45) Date of Patent: Dec. 26, 2017

(54) WIRELESS ETHERNET NETWORK CONTROLLING METHOD AND WIRELESS ETHERNET NETWORK SYSTEM

(71) Applicant: UNIVERSAL SCIENTIFIC INDUSTRIAL (SHANGHAI) CO., LTD., Shanghai (CN)

(72) Inventors: Chih-Chun Chen, Nantou County (TW); Yi-Chun Lo, Nantou County (TW)

(73) Assignee: UNIVERSAL SCIENTIFIC INDUSTRIAL (SHANGHAI) CO., LTD., Shanghai (CN)

( * ) Notice: Subject to any disclaimer, the term of this patent is extended or adjusted under 35 U.S.C. 154(b) by 367 days.

(21) Appl. No.: 14/660,402

(22) Filed: Mar. 17, 2015

(65) Prior Publication Data

US 2016/0212772 A1    Jul. 21, 2016

(30) Foreign Application Priority Data

Jan. 19, 2015   (CN) .......................... 2015 1 0026215

(51) Int. Cl.
*H04L 12/46*    (2006.01)
(52) U.S. Cl.
CPC ................................ *H04L 12/4641* (2013.01)
(58) Field of Classification Search
CPC ..... H04W 12/06; H04W 88/00; H04W 88/02; H04W 88/08; H04W 76/02; H04W 84/12; H04L 12/4641; H04L 63/08
See application file for complete search history.

(56) References Cited

U.S. PATENT DOCUMENTS

| 6,505,258 B1* | 1/2003 | Sakarda | G06F 13/4081 710/109 |
| 2002/0072391 A1* | 6/2002 | Itoh | H04L 12/24 455/557 |
| 2004/0049544 A1* | 3/2004 | Kuroda | G06F 9/461 709/204 |

(Continued)

FOREIGN PATENT DOCUMENTS

| CN | 102523637 B | 6/2012 |
| TW | 200816772 A | 4/2008 |

(Continued)

*Primary Examiner* — Benjamin H Elliott, IV
*Assistant Examiner* — Prince A Mensah
(74) *Attorney, Agent, or Firm* — Li & Cai Intellectual Property (USA) Office (57) ABSTRACT

The present disclosure provides a wireless Ethernet network controlling method, for connecting a mobile device to an Ethernet through a wireless dock, comprising: connecting an Ethernet PHY of a wireless dock to an Ethernet; wirelessly linking a first wireless NIC of the wireless dock to a second wireless NIC of a mobile device; a control server unit of the wireless dock receiving an operation status setting signal through the first wireless NIC generated by a virtual Ethernet NIC, and the control server unit transmitting the operation status setting signal to the Ethernet PHY for setting-up the operation status of the Ethernet PHY; and a VLAN unit processing the data packets transmitted between the Ethernet PHY and the first wireless NIC. Accordingly, the user of the mobile device can experience the complete functions of the Ethernet device.

14 Claims, 5 Drawing Sheets

(56) References Cited

U.S. PATENT DOCUMENTS

| | | | |
|---|---|---|---|
| 2006/0233191 A1* | 10/2006 | Pirzada | H04W 88/00 370/463 |
| 2007/0064661 A1* | 3/2007 | Sood | H04L 29/12481 370/338 |
| 2008/0075024 A1 | 3/2008 | Chuang et al. | |
| 2009/0109984 A1* | 4/2009 | Huber | H04W 12/06 370/401 |
| 2009/0175283 A1* | 7/2009 | Jan | G06F 13/4045 370/401 |
| 2012/0044863 A1 | 2/2012 | Huang | |
| 2012/0173765 A1* | 7/2012 | 't Hooft | G06F 1/1632 710/8 |
| 2012/0282858 A1 | 11/2012 | Gill et al. | |
| 2013/0114610 A1 | 5/2013 | Poleyn et al. | |
| 2013/0163613 A1 | 6/2013 | Zhao | |
| 2013/0318261 A1* | 11/2013 | Cheng | G06F 13/385 710/62 |
| 2014/0056317 A1* | 2/2014 | Sanders | H04J 3/1629 370/474 |
| 2014/0269712 A1 | 9/2014 | Kidambi | |
| 2014/0334336 A1 | 11/2014 | Chen et al. | |

FOREIGN PATENT DOCUMENTS

| | | | |
|---|---|---|---|
| TW | 201348921 A | 12/2013 | |
| TW | 201349794 A | 12/2013 | |
| TW | I449456 B | 8/2014 | |
| TW | 201444398 A | 11/2014 | |

* cited by examiner

WIRELESS ETHERNET NETWORK CONTROLLING METHOD AND WIRELESS ETHERNET NETWORK SYSTEM

BACKGROUND OF THE INVENTION

1. Field of the Invention

The instant disclosure relates to an Ethernet network controlling method; in particular, to a wireless Ethernet network controlling method and a wireless Ethernet network system.

2. Description of Related Art

Figure 1:
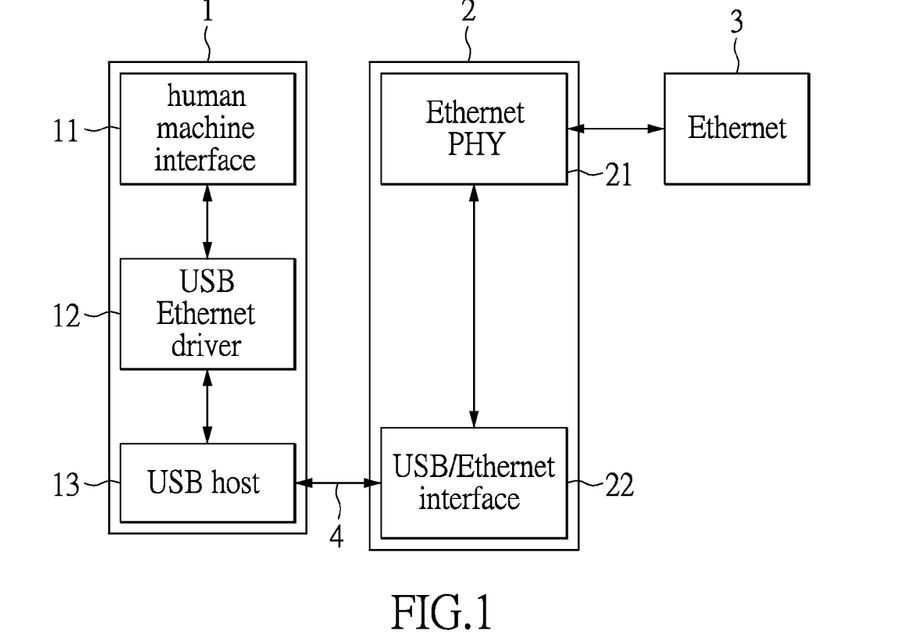
FIG. 1 shows an architecture diagram of a USB Docking station connected with a mobile device.

The conventional docking station (can be abbreviated as "dock") is wired (for example, using the universal serial bus, USB) connected to the client. Architecture of a conventional USB docking station connected with a mobile device is shown in FIG. 1. The USB host 13 of the mobile device 1 is connected to the USB to Ethernet interface 22 of the docking station 2 through a UBS cable 4, and the Ethernet physical layer (Ethernet PHY) 21 is connected to the Ethernet 3. For the client, the human machine interface 11 of the client can be the operating system (OS) or applications, for example. And, the human machine interface 11 uses a USB Ethernet driver 12 to receive/send data from/to the Ethernet 3. When the mobile device 1 of the client has to be moved, the docking station 2 connected with the mobile device 1 has to be moved together with the mobile device 1. However, the range of movement between the mobile device 1 and the docking station 2 is restricted to the length of the USB cable 4 which is usually shorter than three meters. Additionally, the peripheral (such as the display) is usually not convenient to be moved. Therefore, the docking station 2 is not usually moved together with the client.

Relatively, the purpose of using a wireless dock is to get rid of the limitation of the wires by using the wireless network to replace the wired link interface. Further, the conventional wireless dock uses the way of USB over IP, in order to let the client access the peripherals of the dock by using the network. However, the present USB over IP has efficiency limitations. For example, when accessing the Ethernet by the USB over IP, the Ethernet access is restricted to the disadvantage of bandwidth, and the Ethernet access has to share the bandwidth with other USB devices.

Additionally, the Ethernet device of a conventional wireless access point can only provide sharing the Ethernet resource, but the wireless client cannot manage the Ethernet device. It is not able to directly setup the related Ethernet configurations for using the Ethernet as "native" Ethernet.

SUMMARY OF THE INVENTION

The object of the instant disclosure is to provide a wireless Ethernet network controlling method and a wireless Ethernet network system, which allows the mobile device to directly control and apply the wireless Ethernet as if using the "native" Ethernet device.

In order to achieve the aforementioned objects, according to an embodiment of the instant disclosure, a wireless Ethernet network controlling method is provided. The wireless Ethernet network controlling method is used for connecting a mobile device to an Ethernet though a wireless dock, the method comprises the following steps: connecting an Ethernet physical layer (PHY) to the Ethernet; wireless linking a first wireless network interface card (NIC) of the wireless dock with a second wireless NIC of the mobile device; a control server unit of the wireless dock receiving an operation status setting signal from a virtual Ethernet NIC of the mobile device through the first wireless NIC, and the control server unit transmitting the operation status setting signal to the Ethernet PHY for setting-up the operation of the Ethernet PHY; and a virtual local area network (VLAN) unit processing the data packets transmitted between the Ethernet PHY and the first wireless NIC.

In order to achieve the aforementioned objects, according to an embodiment of the instant disclosure, a wireless Ethernet network system is provided. The wireless Ethernet network system comprises a mobile device and a wireless dock. The mobile device comprises a virtual Ethernet network interface card (NIC) and a second wireless NIC. The virtual Ethernet NIC is used for generating an operation status setting signal. The wireless dock comprises an Ethernet physical layer (PHY), a first wireless NIC, a control server unit and a virtual local area network (VLAN) unit. The Ethernet PHY is used for connecting an Ethernet. The first wireless NIC is used for wirelessly linking with the second wireless NIC of the mobile device. The control server unit receives the operation status setting signal from the virtual Ethernet NIC of the mobile device through the first wireless NIC, and transmits the operation status setting signal to the Ethernet PHY for setting-up the operation of the Ethernet PHY. The VLAN unit is for bridging with the Ethernet PHY, and connects the first wireless NIC, wherein the VLAN unit is for processing the data packets transmitted between the Ethernet PHY and the first wireless NIC.

In summary, the embodiments of the instant disclosure provide a wireless Ethernet network controlling method and a wireless Ethernet network system, which can directly bridge the client and the Ethernet device of the dock, such that the Ethernet could perform high speed transmission by using the available wireless network bandwidth. Additionally, the bridge method capable of Ethernet setup and control allows the client to further setup and apply the Ethernet device (for example, setting the data transfer rate), and the applied Ethernet device and the existing wireless network to operate separately. In this way, the conventional usage manner of a wired dock is retained and the convenience of wireless transmission is achieved.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 2:
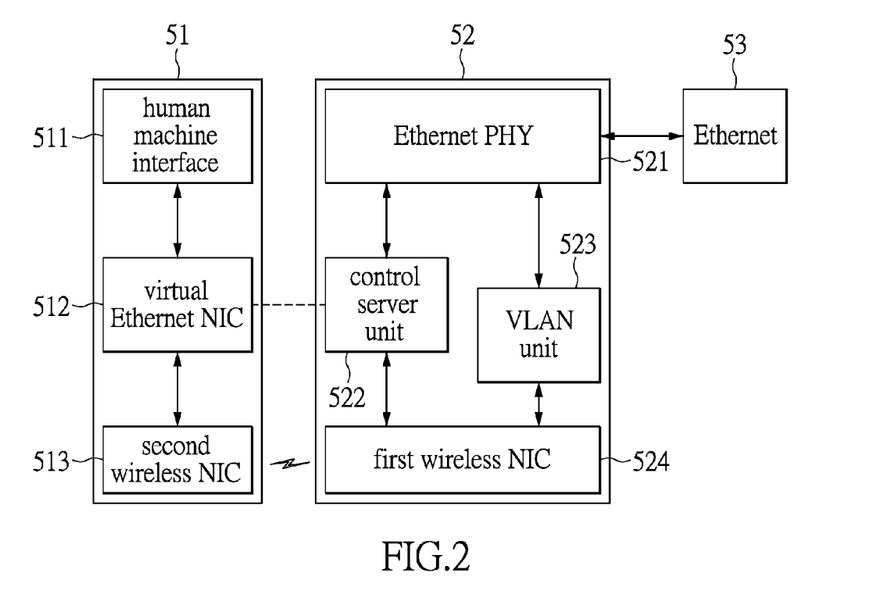
FIG. 2 shows an architecture diagram of a wireless Ethernet network system according to an embodiment of the instant disclosure.

Please refer to FIG. 2 showing an architecture diagram of a wireless Ethernet network system according to an embodiment of the instant disclosure. The wireless Ethernet network system comprises a mobile device 51 and a wireless dock 52. The mobile device 51 comprises a human machine interface (HMI) 511 (for example, comprising the software of the operating system and applications), a virtual Ethernet network interface card (NIC) 512 and a second wireless NIC 513. The wireless dock 52 comprises an Ethernet physical layer (PHY) 521, a first wireless NIC 524, a control server unit 522 and a virtual local area network (VLAN) unit 523. The wireless dock 52 of this embodiment is considered as a server, and the mobile device 51 is considered as a client. In practical applications, the wireless dock 52 considered as a server can be designed to be controlled by a Linux system, but the instant disclosure is not restricted thereto.

The mobile device 51 can be a notebook (NB) or a tablet PC, but the instant disclosure is not so restricted. The virtual Ethernet NIC 512 of the mobile device 51 is used for generating an operation status setting signal. The client can control the virtual Ethernet NIC 512 through the human machine interface 511. When the client (the mobile device 51) links the second wireless NIC 513 and the first wireless NIC 524 of the wireless dock 52, the virtual Ethernet NIC 512 corresponding to the control server unit 522 can be established. As shown in FIG. 2, a dashed line connected between the virtual Ethernet NIC 512 and the control server 522 represents that the virtual Ethernet NIC 512 and the control server 522 are two objects which communicate with each other. But the dashed line does not represent the signal transmission path. The virtual Ethernet NIC 512 of the mobile device 51 is established in the media access control (MAC) of the data link layer.

The Ethernet PHY 521 is used for connecting an Ethernet 53. From the point of view of software, the Ethernet PHY 521 is regard as an Ethernet device in the system. The first wireless NIC 524 is used for wirelessly linking with the second wireless NIC 513 of the mobile device 51. In practical applications, the first wireless NIC 524 and the second wireless NIC 513 can be WiFi network interface cards. However, the types and specifications of the wireless network in the instant disclosure are not so restricted.

The control server unit 522 receives the operation status setting signal from the virtual Ethernet NIC 512 of the mobile device 51 through the first wireless NIC 524, and transmits the operation status setting signal to the Ethernet PHY 521 for setting the operation of the Ethernet PHY 521. The VLAN unit 523 is for bridging with the Ethernet PHY 521, and connects the first wireless NIC 524, wherein the VLAN unit 523 is for processing the data packets transmitted between the Ethernet PHY 521 and the first wireless NIC 524.

When the client has to set the status of the used Ethernet, the virtual Ethernet NIC 512 is used to control the Ethernet PHY 521 of the wireless dock 52 through the control server unit 522. Specifically, the user can use the human machine interface 511 (the operating system or the applications) to set the operation status setting signal of the virtual Ethernet NIC 512, and then the virtual Ethernet NIC 512 wirelessly transmits the operation status setting signal to the first wireless NIC 524 through the second wireless NIC 513. Regarding the signal transmission path, the operation status setting signal generated by the virtual Ethernet NIC 512 is transmitted to the second wireless NIC 513 first, then the operation status setting signal is transmitted to the first wireless NIC 524 in the manner of wireless transmission. And then, the first wireless NIC 524 transmits the operation status setting signal to the control server unit 522, and the control server unit 522 performs the operation status setting to the Ethernet PHY 521. On the other hand, through the same path, the control server unit 522 can transmit the status signal, corresponding to the Ethernet PHY 521, to the virtual Ethernet NIC 512 of the mobile device 51 in reverse direction. Accordingly, the client can acquire the setting status of the Ethernet. The operation status of the Ethernet PHY 521 can be determined by the specifications of the Ethernet PHY 521 in practical applications. The operation status of the Ethernet PHY 521 can be data transfer rate, duplex, media status, support of auto-negotiation and power saving characteristics for example, but the instant disclosure is not so restricted. In practical applications, the operation status of the Ethernet PHY 521 is reflected by the virtual Ethernet NIC 512, and the parameters of the operation status are indicated by the configurations of the driver of the virtual Ethernet NIC 512 in the operating system used by the client. The driver is a computer program.

On the other hand, regarding the data transmitted between the mobile device 51 and the Ethernet 53, the data is usually realized in the form of packets. In this embodiment, the data from the mobile device 51 is transmitted to the VLAN unit 523 through the second wireless NIC 513 and the first wireless NIC 524, and the data from the mobile device 51 is transmitted to the Ethernet PHY 521 through the VLAN unit 523, such that the data from the mobile device 51 can be transmitted to the Ethernet 53. Relatively, the data from the Ethernet 53 is transmitted to the VLAN unit 523 through the Ethernet PHY 521, and then the data is transmitted to the first wireless NIC 524 through the VLAN unit 523, such that the data from the Ethernet 53 can be transmitted to (the second wireless NIC 513 of) the mobile device 51. Specifically, when the wireless dock 52 of the mobile device 51 sends data packets from the Ethernet PHY 521 to the mobile device 51, the VLAN unit 523 tags each data packet with a VLAN tag and then sends the tagged data packets to the second wireless NIC 513 of the mobile device 51 through the first wireless NIC 524. When the mobile device 51 sends data packets to the wireless dock 52 of the mobile device 51, the VLAN unit 523 untags each data packet having the VLAN tag and sends the untagged data packets to the Ethernet PHY 521.

As mentioned above, the second wireless NIC 513 and the first wireless NIC 524 are responsible for wirelessly transmitting the operation status setting signal (to the control server unit 522), the status signal (from the control server unit 522), and responsible for transmitting the data received/sent between the mobile device 51 and the Ethernet 53.

Figure 3:
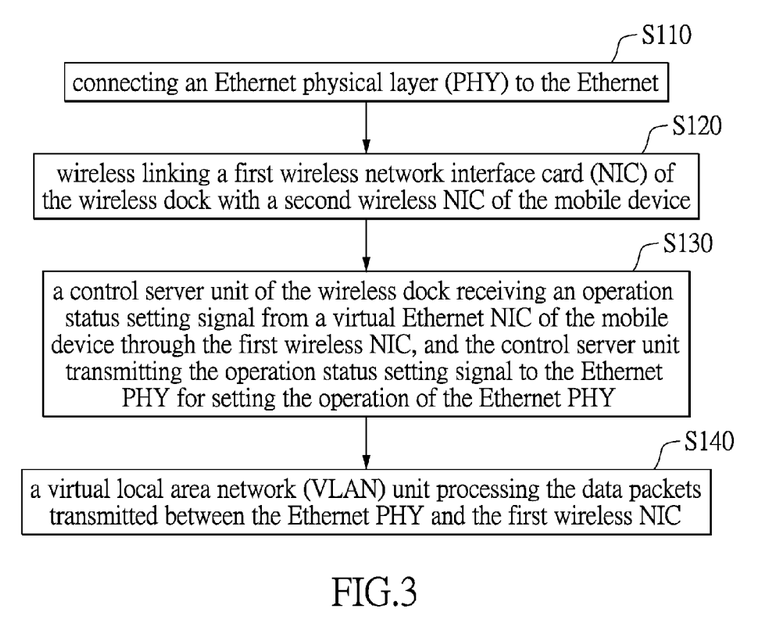
FIG. 3 shows a flow chart of the wireless Ethernet network controlling method according to an embodiment of the instant disclosure.

Please refer to FIG. 2 in conjunction with FIG. 3, based on the aforementioned wireless Ethernet network system, from the point of view of software, this embodiment provides a wireless Ethernet network controlling method comprising steps as follows. Firstly, in step S110, connecting the Ethernet PHY 521 of the wireless dock 52 to the Ethernet. Then, in step S120, wirelessly linking the first wireless NIC 524 of the wireless dock 52 with a second wireless NIC 513 of the mobile device 51. Then, in step S130, the control server unit 522 of the wireless dock 52 receiving an operation status setting signal from the virtual Ethernet NIC 512 of the mobile device 51 through the first wireless NIC 524, and the control server unit 522 transmitting the operation status setting signal to the Ethernet PHY 521 for setting the operation of the Ethernet PHY 521. Then, in step S140, the VLAN unit 523 processing the data packets transmitted between the Ethernet PHY 521 and the first wireless NIC 524.

Figure 4:
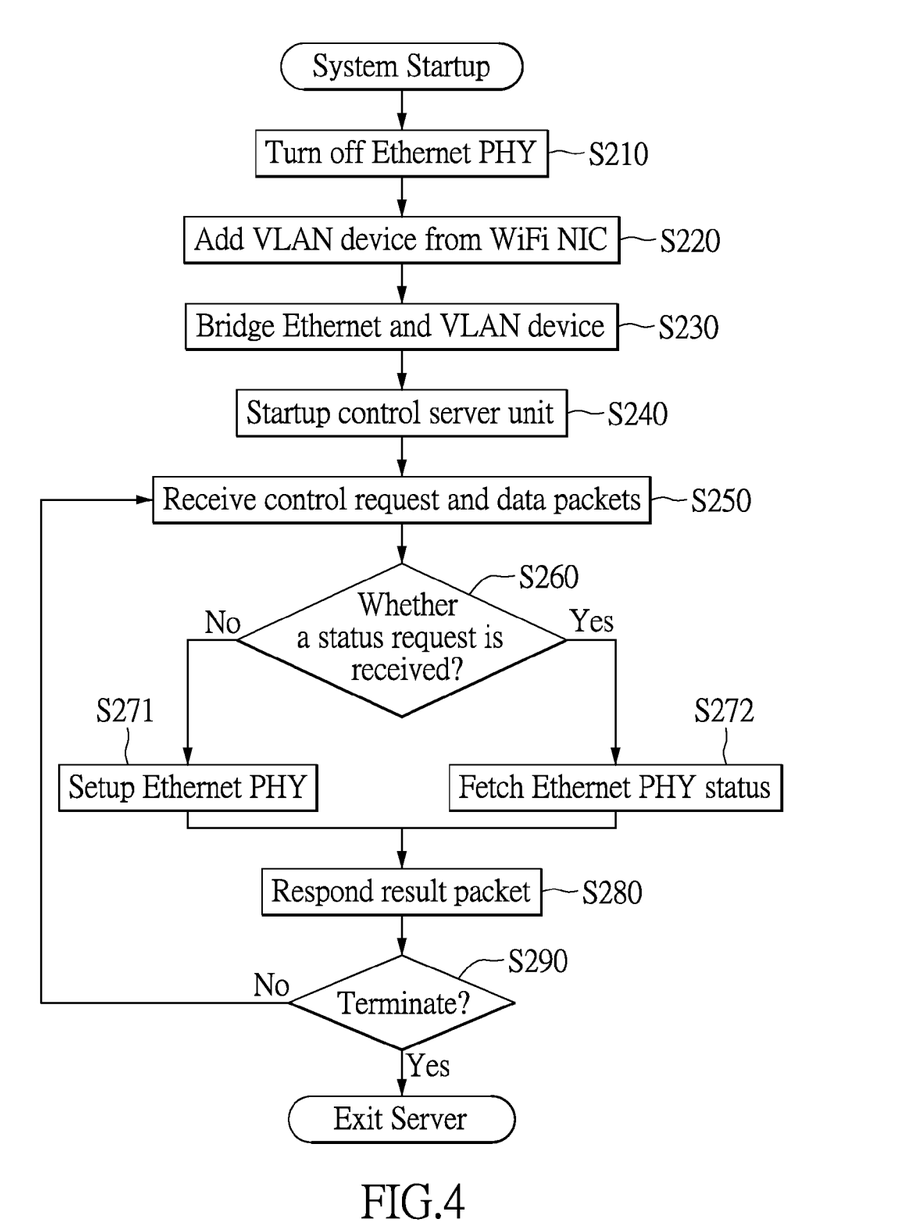
FIG. 4 shows a flow chart of startup and setup configurations of the wireless dock according to an embodiment of the instant disclosure.
Figure 5:
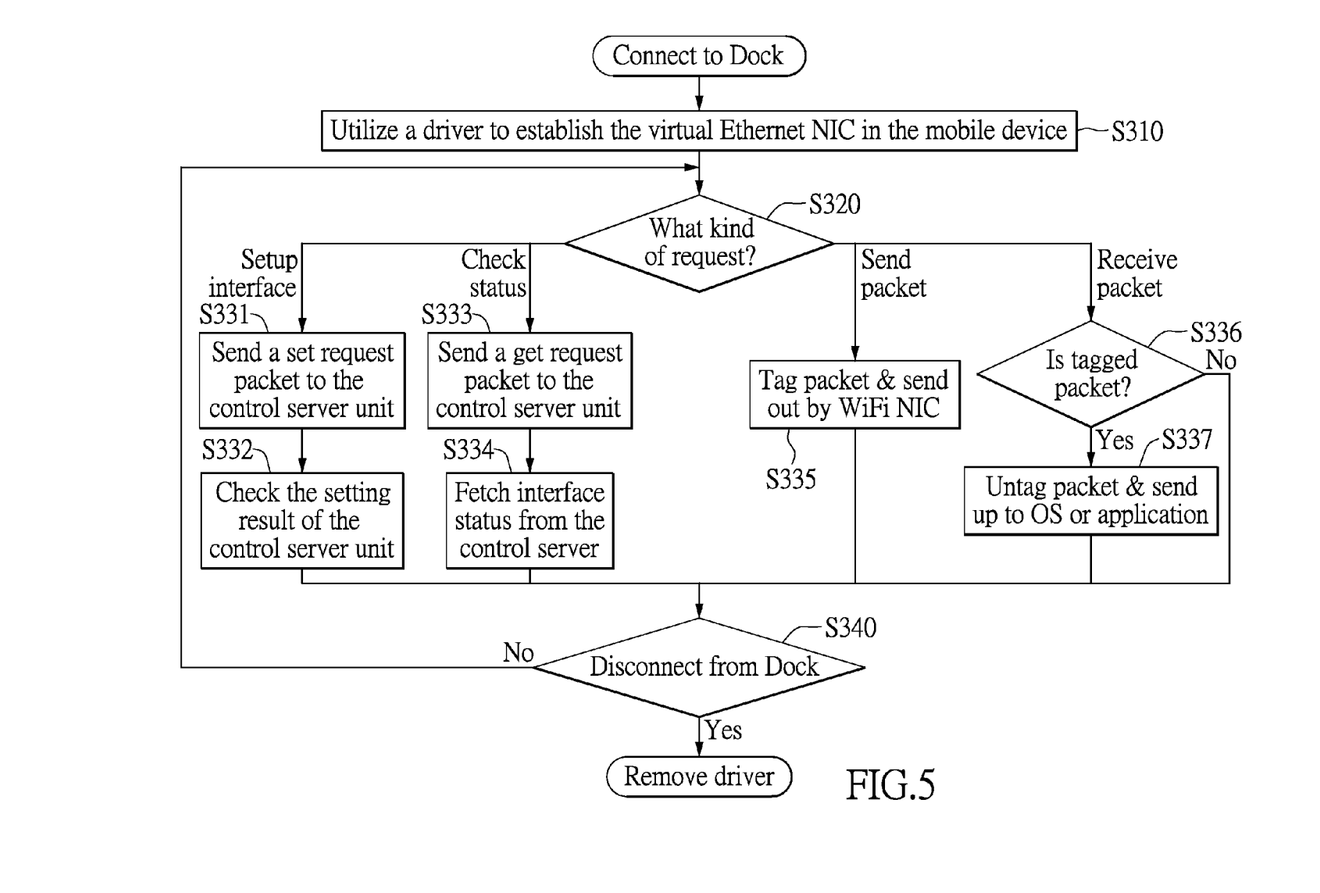
FIG. 5 shows a flow chart of the mobile device establishing linking and setting configuration with the wireless dock according to an embodiment of the instant disclosure.

Then, please refer to FIG. 4 in conjunction with FIG. 5, for further describing the flow of the mobile device 51 establishing linking and setting configuration with the wireless dock 52. In FIG. 4 and FIG. 5, the wireless network is realized by Wireless Fidelity (WiFi). However, the flow charts of FIG. 4 and FIG. 5 are only for ease of description, not for restricting the scope of the present invention. FIG. 4 shows a flow chart of startup and setup configurations of the wireless dock according to an embodiment of the instant disclosure. Firstly, after system startup, executing step S210, turn off Ethernet PHY 521 (temporarily), for executing the following setup. Then, in step S220, add a VLAN device from the WiFi NIC, that is establishing the VLAN unit 523 corresponding to the first NIC 524 (which is the WiFi NIC), referred to in FIG. 2. The VLAN unit 523 is a VLAN device in the form of software, for tagging and un-tagging the data packets. Then, in step S230, bridge Ethernet and the VLAN device, that is utilizing the VLAN unit 523 to bridge the Ethernet PHY 521 (which is considered as an Ethernet device from the point of view of software) and the first wireless NIC 524 in the wireless dock 52, such that the data packets can be sent from or received by the Ethernet device. Then, executing step S240, startup the control server unit which is to startup the control server unit 522 shown in FIG. 2, for receiving and replying the status and setting for the Ethernet PHY 521 (Ethernet device) commanded by the client. The mentioned status comprises data transfer rate, duplex, media status, support of auto-negotiation and power saving characteristics, and so on. The mentioned setting comprises data transfer rate, duplex, enabling/disabling media status, turning on/off support of auto-negotiation and power saving characteristics, and so on. And, when the setting is received, the setting is directly applied to the Ethernet PHY 521 (Ethernet device) or the status of the Ethernet PHY 521 (Ethernet device) is replied to the client.

Then, executing step S250, receive control request and data packets. Then, in step S260, utilizing the control server unit 522 to determine whether a status request (from the mobile device 51) is received. If the status request is not received, executing step S271, the control server unit 522 setting up the status of the Ethernet PHY 521. If the status request is received, executing step S272, the control server unit 522 fetching the status of the Ethernet PHY 521. Then, executing step S280 after step S271 and step S272 are finished, respond the result packet, in order to reply the status (or the result of setting the status) of the Ethernet PHY 521 to the mobile device 51. Then, executing step S290, determining whether to terminate. If it should be terminated, exit the setting procedure of the server. If it is not to be terminated, go to step S250 again. Accordingly, the mobile device can directly link to an external Ethernet or device through the Ethernet PHY 521 of the wireless dock 52.

Please refer to FIG. 5, showing a flow chart of the mobile device establishing linking and setting configuration with the wireless dock according to an embodiment of the instant disclosure. For the mobile device 51 which is regarded as a client, after (wirelessly) linking to the wireless dock 52, executing step S310 firstly. In step S310, utilize a driver to establish the virtual Ethernet NIC 512 in the mobile device 51. The driver is a computer program. In other words, the driver is utilized to establish the virtual Ethernet NIC 512 in the MAC of the data link layer, wherein the virtual Ethernet NIC 512 is considered as a wireless Ethernet device from the point of view of software. Then, in step S320, the driver determines the type of a control request for the virtual Ethernet NIC 512. The type of the control request can be divided into two types, in which the first type is setting-up the interface and checking the status and the second type is sending data packets or receiving data packets.

When the control request is setting-up the interface, executing step S331 and step S332. In step S331, the driver of the virtual Ethernet NIC 512 sending at least a set request packet to the control server unit 522, wherein the control request is the operation status setting signal. Then, in step S332, the virtual Ethernet NIC 512 checking the setting result of the control server unit 522. That is, the driver is utilized to control the wireless Ethernet NIC 512 and the control server unit 522 to send/receive the setting and status of the Ethernet device (which is the Ethernet PHY 521). For example, when the user sets the data transfer rate of the virtual Ethernet NIC 512, the setting signal is sent to the control server unit 522. In practical applications, when virtual Ethernet NIC 512 communicates with the control server unit 522, a specific format of packets and agreements are needed to be used, in order to check the integrity and safety of data.

When the control request is checking status, executing step S333 and step S334. In step S333, the driver of the virtual Ethernet NIC 512 sending at least a get request packet to the control server unit 522. Then, in step S334, fetching operation status of the interface (Ethernet PHY 521) from the operation status of the control server, the control server unit 522.

When it is going to send data packets, executing step S335, utilizing the VLAN unit 512 to generate tagged data packets, then utilizing the WiFi NIC (which is the second wireless NIC 513) to send the tagged data packets. For example, tagging each data packet with a VLAN tag and then sending the tagged data packets through the second wireless NIC 513. On the other hand, it is going to receiving data packets, executing step S336 and step S337. In step S336, determining whether the packet(s) is tagged? If the packet(s) is tagged, executing step S337, untag the packet(s) and send up the packet(s) to the operating system (OS) or the application of the mobile device 51. If the packet(s) is not tagged, executing step S340 directly. That is when the second wireless NIC 513 receives the tagged data packets (for example the packet having the VLAN tag), the second wireless NIC 513 transfers the tagged data packets to the virtual Ethernet NIC 512 for performing untag process and receiving the data.

After the steps S332, S334, S335 or S337 are finished, executing step S340, determining whether to disconnect from the dock. If so, remove the driver; if not, go to step S320 again. In short, according to this embodiment, the virtual Ethernet NIC is established by cooperating the driver of the wireless Ethernet NIC and the VLAN, and a wireless network is utilized to transfer data, and furthermore, the control server unit 522 (control server) of the wireless dock 52 directly executes the communication of setting and status. The client utilizes the way of VLAN and bridge to establish the channel of processing Ethernet data flow, and the control server unit can be used to process the setting and status of the Ethernet.

According to the above descriptions, the wireless Ethernet network controlling method and the wireless Ethernet network system provided in the embodiments of the instant disclosure can directly bridge the client and the Ethernet device of the dock, such that the Ethernet could perform high speed transmission by using the available wireless network bandwidth. Additionally, the bridge method capable of Ethernet setup and control allows the client to further setup and apply the Ethernet device (for example, setting the data transfer rate), and the applied Ethernet device and the existing wireless network to operate separately. In this way, the conventional usage manner of wired dock is retained and the convenience of wireless transmission is achieved. Accordingly, the wireless dock provided in the embodiments of the instant disclosure can provide complete functions of the Ethernet, and the problem of insufficient efficacy of the conventional wireless dock can be overcome, such that the user of the mobile device can experience the complete functions of the Ethernet device.

The descriptions illustrated set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A wireless Ethernet network controlling method, used for connecting a mobile device to an Ethernet though a wireless dock, the method comprising:
    connecting an Ethernet physical layer (PHY) to the Ethernet; wirelessly linking a first wireless network interface card (NIC) of the wireless dock with a second wireless NIC of the mobile device;
    a control server unit of the wireless dock receiving an operation status setting signal from a virtual Ethernet NIC of the mobile device through the first wireless NIC, and the control server unit transmitting the operation status setting signal to the Ethernet PHY for setting-up the operation of the Ethernet PHY;
    and a virtual local area network (VLAN) unit processing the data packets transmitted between the Ethernet PHY and the first wireless NIC;
    wherein the step of wirelessly linking the first wireless network interface card (NIC) of the wireless dock with the second wireless NIC of the mobile device comprises:
    utilizing a driver to establish the virtual Ethernet NIC in the mobile device, wherein the virtual Ethernet NIC and the control server unit are linking through the second wireless NIC and the first wireless NIC;
    the driver is a computer program:
    wherein in the step of the virtual local area network (VLAN) unit processing the data packets transmitted between the Ethernet PHY and the first wireless NIC, when the wireless dock of the mobile device sends data packets from the Ethernet PHY to the mobile device, the VLAN unit tags each data packet with a VLAN tag and then sends the tagged data packets to the second wireless NIC of the mobile device through the first wireless NIC: when the mobile device sends data packets to the wireless dock of the mobile device, the VLAN unit untags each data packet having the VLAN tag and sends the untagged data packets to the Ethernet PHY.

2. The wireless Ethernet network controlling method according to claim 1, wherein the step of connecting an Ethernet physical layer (PHY) to the Ethernet comprising:
    establishing the VLAN unit corresponding to the first NIC; and the VLAN unit of the wireless dock bridging the Ethernet PHY and the first wireless NIC.

3. The wireless Ethernet network controlling method according to claim 2, wherein after the step of the VLAN unit of the wireless dock bridging the Ethernet PHY and the first wireless NIC, the method further comprises:
    the control server unit determining whether a status request is received; the control server unit fetching the status of the Ethernet PHY when the control server unit receives the status request;
    and the control server unit setting up the status of the Ethernet PHY when the control server unit receive the non-status request.

4. The wireless Ethernet network controlling method according to claim 1, wherein in the step of the control server unit of the wireless dock receiving an operation status setting signal from a virtual Ethernet NIC of the mobile device through the first wireless NIC, a human machine interface is utilized to set the operation status signal of the virtual Ethernet NIC, the virtual Ethernet NIC wirelessly transmits the operation signal to the first wireless NIC through the second wireless NIC.

5. The wireless Ethernet network controlling method according to claim 1, wherein after the step of utilizing the driver to establish the virtual Ethernet NIC in the mobile device, the method further comprises:
    the driver determining the type of a control request for the virtual Ethernet NIC.

6. The wireless Ethernet network controlling method according to claim 4, wherein after the step of the driver determining the type of a control request for the virtual Ethernet NIC, the method further comprises:
    the driver of the virtual Ethernet NIC sending at least a set request packet to the control server unit when the control request is setting the status of the virtual Ethernet NIC, wherein the control request is the operation status setting signal;
    and the virtual Ethernet NIC checking the setting result of the control server unit.

7. The wireless Ethernet network controlling method according to claim 4, wherein after the step of the driver determining the type of a control request for the virtual Ethernet NIC, the method further comprises:
    the driver of the virtual Ethernet NIC sending at least a get request packet to the control server unit when the control request is checking the status of the virtual Ethernet NIC;
    and the control server unit fetching the operation status of the Ethernet PHY.

8. The wireless Ethernet network controlling method according to claim 4, wherein in the step of the driver determining the type of a control request for the virtual Ethernet NIC, executing the step of the virtual local area network (VLAN) unit processing the data packets transmitted between the Ethernet PHY and the first wireless NIC when the control request is sending or receiving data packets.

9. The wireless Ethernet network controlling method according to claim 8, wherein the control server unit determines whether a status request is received, the control server unit fetches the status of the Ethernet PHY when the control server unit receives the status request; and the control server unit sets-up the status of the Ethernet PHY when the control server unit receive the nonstatus request.

10. A wireless Ethernet network system, the wireless Ethernet network system using the wireless Ethernet network controlling method according to claim 1, comprising:
    a mobile device, comprising a virtual Ethernet network interface card (NIC) and a second wireless NIC, the virtual Ethernet NIC and the second wireless NIC being connected, the virtual Ethernet NIC used for generating an operation status setting signal;

and a wireless dock, comprising:

an Ethernet physical layer (PHY), used for connecting an Ethernet;

a first wireless NIC, used for wirelessly linking with the second wireless NIC of the mobile device;

a control server unit, connecting with the Ethernet PHY and the first wireless NIC, the control server unit receiving the operation status setting signal from the virtual Ethernet NIC of the mobile device through the first wireless NIC, and transmitting the operation status setting signal to the Ethernet PHY for setting-up the operation of the Ethernet PHY;

and a virtual local area network (VLAN) unit, bridging with the Ethernet PHY, and connecting the first wireless NIC, wherein the VLAN unit is for processing the data packets transmitted between the Ethernet PHY and the first wireless NIC.

11. The wireless Ethernet network controlling method according to claim 8, wherein the virtual Ethernet NIC is established in the mobile device by a driver.

12. The wireless Ethernet network controlling method according to claim 8, wherein the operation status setting signal of the virtual Ethernet NIC is set by a human machine interface.

13. The wireless Ethernet network controlling method according to claim 8, wherein when the wireless dock of the mobile device sends data packets from the Ethernet PHY to the mobile device, the VLAN unit tags each data packet with a VLAN tag and then sends the tagged data packets to the second wireless NIC of the mobile device through the first wireless NIC; wherein when the mobile device sends data packets to the wireless dock of the mobile device, the VLAN unit untags each data packet having the VLAN tag and sends the untagged data packets to the Ethernet PHY.

14. The wireless Ethernet network controlling method according to claim 10, wherein the driver determines the type of a control request for the virtual Ethernet NIC;

the driver of the virtual Ethernet NIC sends at least a set request packet to the control server unit when the control request is setting the status of the virtual Ethernet NIC, wherein the control request is the operation status setting signal; and the driver of the virtual Ethernet NIC sends at least a get request packet to the control server unit when the control request is checking the status of the virtual Ethernet NIC.

* * * * *